United States Patent
Lindemann (10) Patent No.: US 11,449,082 B1
(45) Date of Patent: Sep. 20, 2022

(54) SELF POWERED FLUID SHUTOFF APPARATUS

(71) Applicant: Robert Issac Lindemann, Portland, OR (US)

(72) Inventor: Robert Issac Lindemann, Portland, OR (US)

(*) Notice: Subject to any disclaimer, the term of this patent is extended or adjusted under 35 U.S.C. 154(b) by 95 days.

(21) Appl. No.: 16/870,523

(22) Filed: May 8, 2020

Related U.S. Application Data (63) Continuation-in-part of application No. 16/342,137, filed on Apr. 15, 2019.

(51) Int. Cl.

| | |
|---|---|
| *G01M 3/16* | (2006.01) |
| *H01M 6/34* | (2006.01) |
| *G05D 7/06* | (2006.01) |
| *G01M 3/00* | (2006.01) |
| *H02J 7/14* | (2006.01) |
| *G08B 21/18* | (2006.01) |
| *H04W 4/14* | (2009.01) |
| *H02J 7/02* | (2016.01) |

(52) U.S. Cl.
CPC ............ *G05D 7/0635* (2013.01); *G01M 3/00* (2013.01); *G08B 21/18* (2013.01); *H02J 7/02* (2013.01); *H02J 7/14* (2013.01); *H04W 4/14* (2013.01); *H02J 2207/20* (2020.01)

(58) Field of Classification Search
CPC ................................................ G08B 21/20
See application file for complete search history.

(56) References Cited

U.S. PATENT DOCUMENTS

| | | | | |
|---|---|---|---|---|
| 6,232,883 | B1* | 5/2001 | Silva ................... | G08B 21/084 340/539.1 |
| 7,142,123 | B1* | 11/2006 | Kates .................... | G08B 21/20 340/602 |
| 10,121,353 | B1* | 11/2018 | Billman ............. | G06K 19/0723 |
| 10,393,687 | B1* | 8/2019 | Ostashev .............. | G01N 27/07 |
| 10,564,065 | B1* | 2/2020 | Billman ................ | H04W 4/80 |
| 2006/0172186 | A1* | 8/2006 | Tender .................. | H01M 4/96 429/119 |
| 2008/0211680 | A1* | 9/2008 | Turner ..................... | G08B 3/10 340/604 |
| 2012/0258346 | A1* | 10/2012 | Godden ................. | H01M 6/32 429/118 |

(Continued)

*Primary Examiner* — Albert K Wong
(74) *Attorney, Agent, or Firm* — Mark S Hubert (57) ABSTRACT

A modular leak detection and notification unit comprised of a self powered leak sensor and a remote relay transmitter. It can accommodate any number of leak sensors, that can be positioned at a plethora of different potential leak sites. It presents a signal upon detection of a leak that can be used to generate local audible alarm, a text alarm message to the all cell phones/smart devices that it is directed to notify, or a signal to a battery powered motorized valve positioner that has its battery connected to a trickle charger. The trickle charger is powered by a turbine generator that is placed inline, or in a parasitic bypass line from the fluid line itself. This signal may be routed to its final destination by a low power Bluetooth signal from the relay transmitter, via RF network from a cell chip in the relay transmitter, by internet network via WiFi or via RF transmission through internet contact with a cell carrier.

8 Claims, 3 Drawing Sheets

(56) References Cited

U.S. PATENT DOCUMENTS

| | | | |
|---|---|---|---|
| 2013/0069675 A1* | 3/2013 | Woloszyk | G01M 3/16 |
| | | | 324/693 |
| 2016/0163177 A1* | 6/2016 | Klicpera | G08B 21/18 |
| | | | 137/59 |
| 2018/0196392 A1* | 7/2018 | Bedol | G04B 37/0091 |
| 2018/0216742 A1* | 8/2018 | Korten | G05D 16/0636 |
| 2019/0281371 A1* | 9/2019 | Klicpera | G01M 3/3254 |
| 2020/0096410 A1* | 3/2020 | Lindemann | G01M 3/16 |
| 2020/0225110 A1* | 7/2020 | Knauss | G08B 25/009 |

* cited by examiner

SELF POWERED FLUID SHUTOFF APPARATUS

PRIORITY

This application incorporated by reference herein and is a Continuation-in-Part of U.S. Utility application Ser. No. 16/137,342 entitled "Modular Leak Detector and Method of Use" filed Sep. 20, 2018.

FIELD

The present disclosure relates, in general, to leak detection, and more particularly to remote leak detection and immediate response damage mitigation.

BACKGROUND

Commonly residential, commercial and industrial buildings suffer some level of fluid damage at one time or another, albeit water, oil, gas or the like. More often than not, it is water damage that occurs slowly through minute leaks and across time. These slow leaks are important to catch as soon as possible for three reasons. First, they are often precursors to catastrophic failures. Catastrophic line failures can only be effectively handled if there are personnel onsite when the failure occurs. Second, the fluid or gas from slow leaks can find its way to a plethora of locations, some quite distant from the location. Along its path, it can rot, weaken or destroy vast amounts of property as often these type of leaks go undetected for months or even years until the damage becomes extensive enough to be seen. Third, while in other situations it can result in the toxic, explosive or oxygen elimination buildup of gas.

Presently, there are leak detection systems that can be located adjacent areas prone to leaking, such as under sinks, washing machines, hot water tanks, refrigerators and dishwashers. However, these have downfalls. First, these require vigilance to ensure their batteries are good. Second, if AC powered, these units are useless in a power outage, if the breaker is opened or if the unit is not firmly plugged in. Third, these units are cumbersome, and if they generate an audible alarm, require the presence of someone to act upon the notification. Fourth, these types of units are unsightly and often require special wiring or extension cords to power. Fifth there is a time lag between alarm notification and actual remediation of the issue. Lastly, if there are multiple leak prone spots about the building, the owner must bear the costs of several complete devices.

Henceforth, a remote leak detection notification system that could be used in multiple locations where power is not readily available, and that instantly mitigated the leak in a fail-proof method, would fulfill a long-felt need in the leak detection industry. This new invention utilizes and combines known and new technologies in a unique and novel configuration to overcome the aforementioned problems and accomplish this.

BRIEF SUMMARY

In accordance with various embodiments, a compact, wireless leak detection apparatus that is capable of broadcasting an alert to be acted upon by notified personnel or to initiate a foolproof emergency fluid shutdown is provided.

In one aspect, a modular leak detection device than can be expanded to cover multiple areas with only the addition of multiples of one part of the device.

In another aspect, a self-powered leak detection device with a non degradable battery and that initiates the operation of a fail-proof shutoff valve positioner.

In yet another aspect, a leak detection device that provides their owner a leak notification over their smart devices, computers, pagers, etc.

In yet another aspect, an additive leak detection device that requires no special wiring.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another.

It will be understood that when an element or layer is referred to as being "on," "coupled to," "connected to" or "affixed to" another element or layer, it can be directly on, directly coupled to or directly connected to the other element or layer, or, in an indirect fashion, intervening elements or layers may be present. In contrast, when an element is referred to as being "directly on, "directly coupled to," "directly connected to" or "directly affixed to" another element or layer, there are no intervening elements or layers present. Like numbers refer to like elements throughout. As used herein, the term "and/or" includes any and all combinations of one or more of the associated listed items.

The terminology used in the description of the present invention herein is for the purpose of describing particular embodiments only and is not intended to be limiting of the inventive concept. As used in the description of the present invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

As used herein, the term "water activated battery" means a dry constructed battery stored in the dry condition, and activated at the time of use by the addition of water or an aqueous electrolyte. It generates a DC current.

The present invention relates to a novel design for a self-powered, modular fluid leak detection system that provides a leak signal from a remote relay transceiver that may be used in a plethora of ways to mitigate damage from sending notifications to designated personal or to operating a fail-safe self powered fluid shutoff apparatus. Its simplest embodiment for only leak alarm notification has two components—the leak sensor and the relay transceiver. The fail-safe embodiment to immediately stop the fluid leak has three components—the leak sensor, the relay transmitter, and the fail-safe self powered fluid shutoff apparatus. Although discussed herein as a residential modular leak detection system it is known that it may also be used in military, commercial or industrial settings as well with few, if any modifications.

Figure 1:
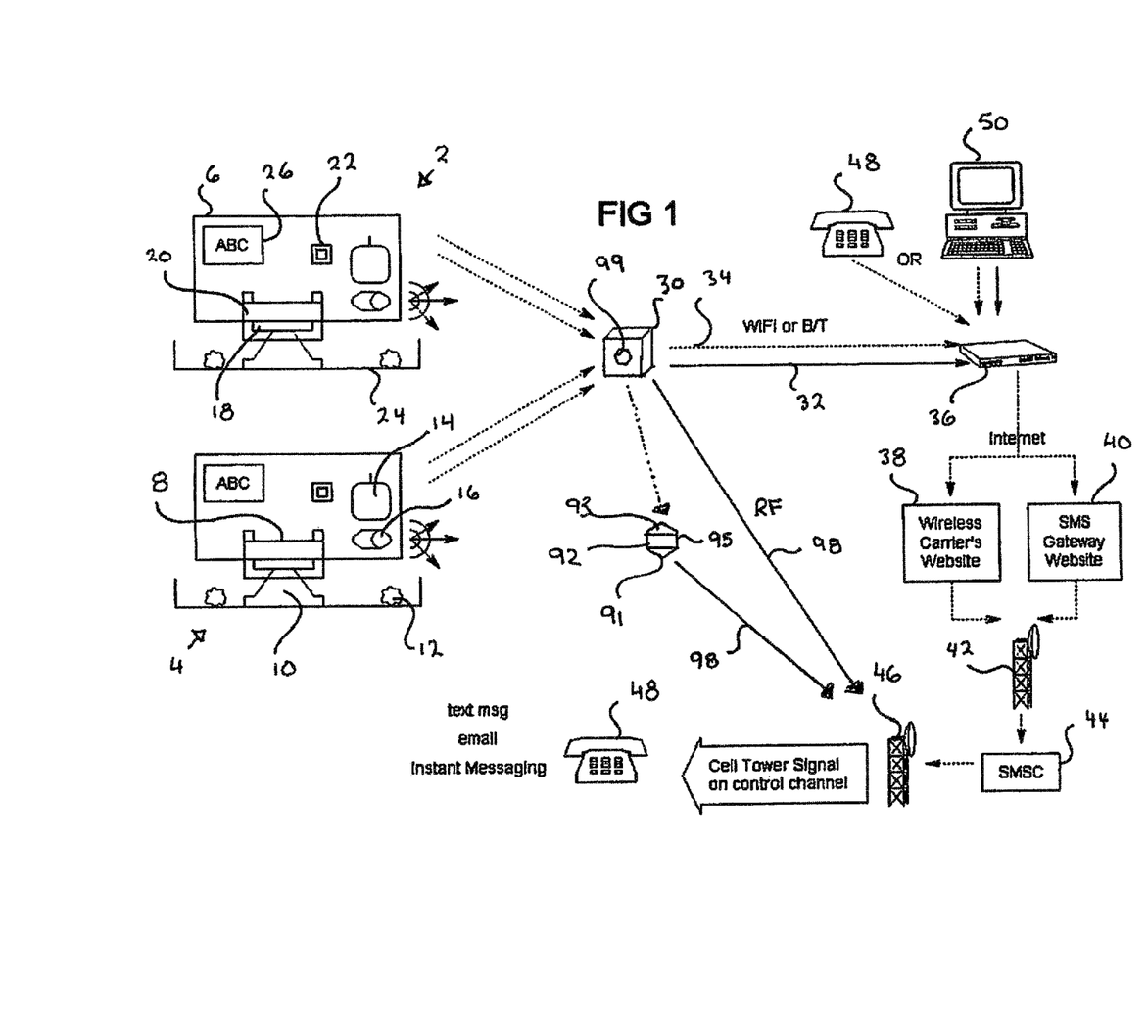
FIG. 1 is a schematic of the modular leak detector with two leak detection sensors.

Looking first at the simplest embodiment, the modular leak detector, of FIG. 1 it can be seen that it has at least one leak sensor although in the illustrated embodiment there are two—a first leak sensor 2 and a second leak sensor 4. The leak sensors 2 or 4 have an enclosure 6 that contains a water activated battery 8, an absorbent material 10, an optional electrolyte salt 12, power management module 22, a wireless location beacon 14, an audible alarm horn 16 and exterior labeling 26. The battery's exterior shell 20 has openings 18 formed there through its exterior shell 20 to allow for the admittance of moisture/water from the leak source. This moisture/water may operatively reach the battery internals directly or by wicking (and capillary action) of the absorbent material 10. The absorbent material 10, in the preferred embodiment, forms an isolator between the anode and cathode in the battery's cells and extends outside the battery's exterior shell through the openings 18 and on horizontal and/or vertical surfaces surrounding the leak sensor 2 or 4. The absorbent material's purpose is to wick up as much leaked water (from vertical or horizontal surfaces) as soon as possible and bring it into contact with the anodes and cathodes of the battery thereby providing the earliest opportunity for power generation to alert the owner of a potential problem. There is an optional waterproof pan 24 to channel water to the absorbent material 10.

Figure 2:
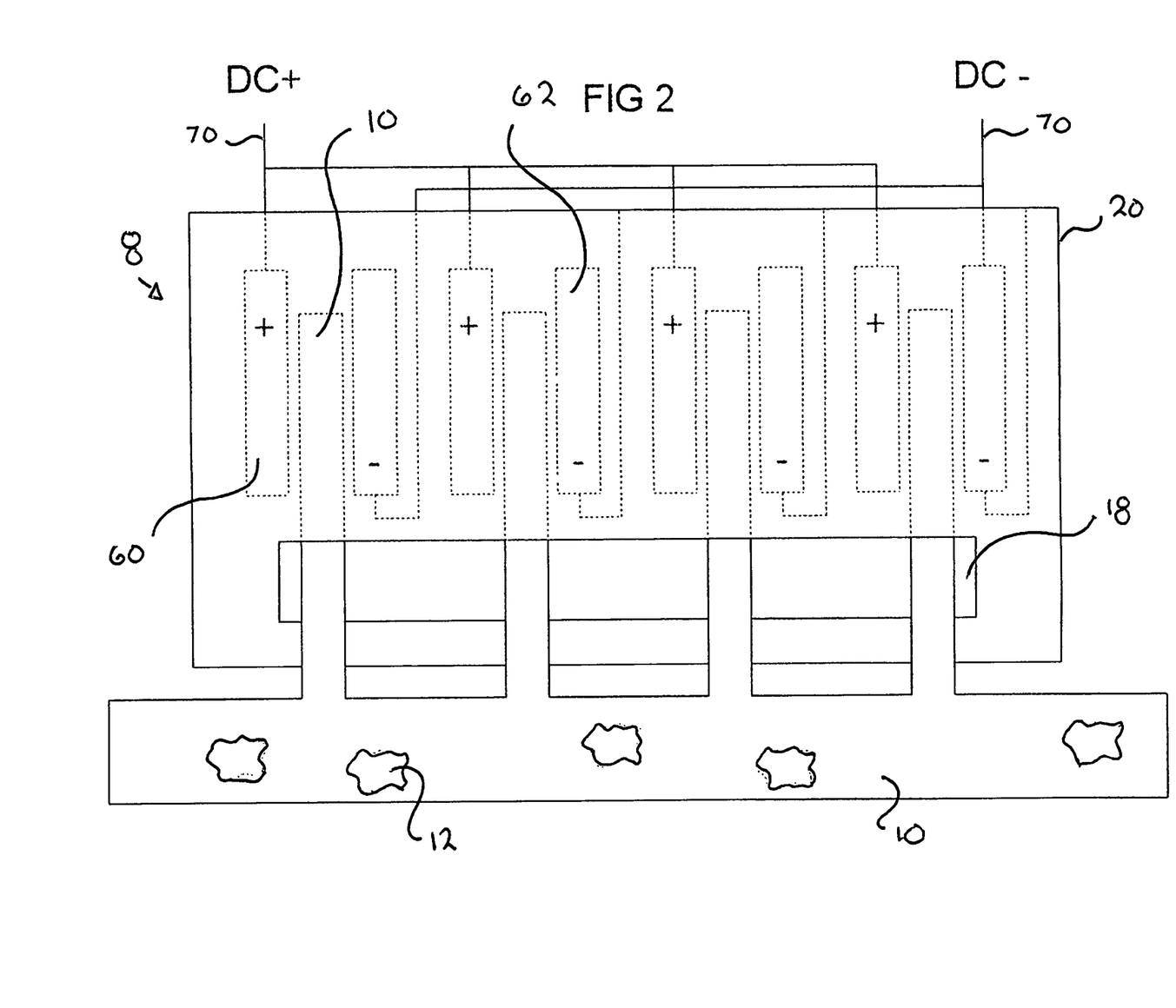
FIG. 2 is a cross sectional view of the self-powered battery.

FIG. 2 shows a cross sectional representation of a multi cell, water powered battery 8. The battery 8 is constructed dry, stored in the dry condition, and activated by contact with water or an aqueous electrolyte. Water activated batteries 8 have an anode 60, a cathode 62, a non-conductor separator that allows water or electrolyte to flow between the anodes and cathodes, two terminals 70 and an exterior shell 20. In this application a nonwoven, absorbent, nonconductive material 10 is used for the dual purpose of separating the electrodes within a cell, and absorbing the electrolyte. (These styles of batteries were designed generally for immersion in water, and here leak detection is desired as soon as any leakage occurs. For this reason, the absorbent material 10 resides between the anode 60 and cathode 62 in the cells but also continues through openings 18 formed in the battery's exterior shell 20 and for a distance onto the ground or in the leak collection pan 24 adjacent the sensor 2 or 4.)

Within the exterior shell 20, multiple cells are connected in series or series-parallel to achieve a desired voltage. The quantity of active material in the electrodes determines the ampere-hour capacity of the battery. The area of the electrodes determines the amount of current the battery can generate. The power output is related to the temperature and salinity of the electrolyte. The battery elements can be optimized in size to power the remainder of the sensor components with a minimum of water leakage or with a flood of water, depending on the type of leak it is to monitor.

Most water-activated batteries use magnesium as the anode material and any of a group of cathode materials. While the preferred embodiment utilizes a magnesium/silver chloride battery, there are numerous types of water activated batteries including but not limited to magnesium/cuprous chloride, magnesium/silver chloride, magnesium/lead chloride, magnesium/cuprous iodide-sulfur, magnesium/cuprous thiocyanate-sulfur, and magnesium/manganese dioxide utilizing an aqueous magnesium perchlorate electrolyte. None of these are efficient as the magnesium/silver chloride system however they are much more cost effective.

These multi cell, water powered batteries 8 are reliable, safe, have high power density, high energy density, instantaneous activation, good pulse loading, long unactivated shelf life and require no maintenance.

The energy producing chemical reaction for the Magnesium/Silver Chloride battery is as follows:

Magnesium/Silver Chloride

Anode Mg 2e→$Mg^{2+}$

Cathode 2AgCl 2e→2Ag 2Cl⁻
Overall Mg 2AgCl→MgCl₂ 2Ag

A side reaction also occurs between the magnesium anode and the aqueous electrolyte, resulting in the formation of magnesium hydroxide, hydrogen gas, and heat.

Mg 2H₂O→Mg(OH)₂ H₂

Since the reaction proceeds best with a strong electrolyte and the modular leak detector will primarily be used for water detection leaks, an electrolytic booster such as a salt will be placed in the battery shell 20, in/on the nonconductive material 10 or in the optional pan 24. (In the preferred embodiment this electrolyte is NaCl.)

The leak sensors 2 or 4 typically can be placed on the ground adjacent a site having a leak potential. Such sites in a residential setting are, refrigerators, dishwashers, hot water tanks, toilets, sinks, washing machines, icemakers, dehumidifiers, etc. and any location where there are plumbing lines behind the walls. The leak sensors 2 or 4 may be placed into a waterproof pan 24 to help collect and channel any leaked fluids into the battery's openings 18. The pan 24 may supplement or may eliminate the need for the absorbent material 10 beyond the battery openings 18. (However, if the absorbent material 10 is completely eliminated, there will have to be nonconductive spacers placed between the anodes and cathodes in the battery cells.)

The electrolyte 12 generally is a dry salt used to enhance the chemical reactions inside the battery shell 20 to increase electrical generation. It may be placed inside the battery shell 20, placed on or imbedded in the absorbent substrate 10 or placed outside the battery shell 20 on the pan 24. It also is optional depending upon the specific chemistry of the water activated battery chosen and the type of fluid expected to be leaked. For example, the electrolyte is not necessary where salt water is the circulated fluid with the potential for leakage.

The power management module 22 may be any of several electronic devices such as a resistor, voltage regulator or a microprocessor controlled unit that regulates and distributes the power generated by the battery 8 at the operating voltages and currents required by the wireless location beacon 14 and the alarm horn 16. These devices are well known in the art. In alternate embodiments the power management module may be a simple resistor.

The wireless location beacon 14 is an electronic unit assigned a unique identifier that when powered, broadcasts this identifier wirelessly and locally in a repeating fashion. The wireless beacon may have its unique identifier imbedded in its architecture or it may be input into memory by any of a plethora of known methods. Generally, there is nothing in the data package it broadcasts except its unique identifier. Although any of the commonly available wireless RF transmission protocols and standards may be used, in the preferred embodiment the wireless transmission from the wireless location beacon 14 will be Bluetooth Low Energy wireless personal area network technology standard used for transmitting data over short distances. It is designed for low energy consumption and cost, while maintaining a communication range similar to that of its predecessor, the Classic Bluetooth. This way a single coin cell battery backup in the remote transceiver will be able to operate for extended periods up to the three year range if A/C power is lost, or the unit bumped and partially unplugged. It is expected that the relay transceiver 30 will be located at the nearest electrical outlet to the leak sensors 2 or 4 and well within 100 feet of the wireless location beacon 14 as most building codes require electrical outlets to be placed about a residence in closer distances than this.

The alarm horn 16 may be of any of a number of loudspeakers. In the preferred embodiment piezoelectric horns (also referred to as piezoelectric speakers) are used. These are low powered electric devices that use the piezoelectric effect for generating sound. They apply a voltage to a piezoelectric material, which causes vibration that is converted into audible sound using diaphragms and resonators. This style of audible alarm is used because it is resistant to overloads that would destroy other high frequency drivers, and because of its electrical properties, can be used without a crossover. Although they are inferior in midrange and low frequency response, here, volume and high pitch are more important for alarm notification rather than sound quality.

The exterior labeling 26 on the sensors 2 or 4 show the identification numbers specific to that leak sensor, and/or instructions for the setup of the modular leak detector with the relay transceiver it is to be linked to. The labeling may be affixed to the exterior of the enclosure 6 in the form of a sticker, embossing, ink labeling, hang tag, or the equivalent labeling device. In the non-preferred embodiment, these identification numbers and setup instructions may be viewable on the internet and only a pointer to that website will be in the exterior labeling. This labeling may be in the form of a matrix or other type bar code that is read into the smart device and input into the application as the identification numbers specific to that leak sensor, and/or instructions for the setup of the modular leak detector with the relay transceiver it is to be linked to.

The second part of the modular leak detector is the relay transceiver 30. This is an electronic transceiver mated to a relay microprocessor that continually or intermittently scans for the wireless location beacon's ID signal, and upon receipt of this RF signal, determines the alarming beacon's location from its relational database then generates an alert that it sends for routing to the alarm's final destination. The relay microprocessor contains instructions in the form of an application that accesses a database that relates the location beacon's identification to its physical location. This location is what it transmits (preferably via a wireless RF signal) to the end user for corrective and remedial action. The relay transceiver 30 is connected to the local router for that communication system. This may be by hard wire 32 or wireless connection 34. (It can also be via a satellite connection which is a router to the internet.) In the preferred embodiment, this will be by a common wireless protocol such as low power blue tooth or WiFi. The relay transceiver 30 may be directly connected to an A/C power source (preferred), powered by a battery or both. However, with today's battery technology it is possible to satisfy all the power needs of this device for approximately 3 years with a coin cell battery.

In an alternate embodiment the relay transceiver(s) 30 may contain a cell chip 99 directed by its microprocessor to directly communicate through RF signals 98 with the designee's cell phone via the cell tower 46. However, since cell chips and activation/monthly fees are expensive, it would not be practical to have a cell chip in every relay transceiver where there are multiple relay receivers in a single residence. (This occurs in large houses where not all the wireless signals from the multiple distributed beacons are strong enough to reach the single relay transceiver.) depending upon the distance between the leak sensors. In this case, there would be a cell hub 95 (microprocessor 91, WiFi transceiver 92 and cell chip 93) that receives a signal via the WiFi from any of the relay transceivers 30, that directs the microprocessor in the cell hub 95 to directly communicate through RF signals 98 with the designee's cell phone via the cell tower 46.

In operation, the user obtains the correct number of leak sensors 2 required. They are directed via the instructions on the exterior labeling 26 on the sensor's enclosure 6, to download the install application onto their smart device. (The following assumes that the smart device is connected to the local router 36, a satellite or the cellular network.) The exterior labeling also lists the unique identifier for the location beacon in that enclosure 6. The relay transceiver 30 is plugged into an A/C outlet and its wireless transceiver broadcasts or directly sends a signal to a satellite or local router 36 (or possibly directly to the cellular network). The router sees this signal but will not connect to the relay transceiver 30 without authorization. The install application on the smart device (generally a cell phone) is loaded and accessed, and through a series of on screen instructions prompts the connection of the relay transceiver 30 to the local router. It also prompts the user to input the physical locations where the various leak sensors are physically located into the relational database of the relay microprocessor. Lastly, the install application prompts the input of the cell phone numbers of all of the users to be notified along with the internet address of their specific carriers. In the instruction set on the relay microprocessor is an algorithm that combines the phone numbers with the internet address of their specific cell phone carriers and also with the internet address of a free SMS Gateway provider's website. This allows the alarm text to be routed to the user's smart phone two different ways.

The leak sensor 2 is placed adjacent or beneath the area to be monitored for leakage. When a leak occurs, the water is channeled to the battery openings 18 either directly (as with a catastrophic leak) or via wicking or capillary action of the absorbent material. Once inside the battery, the water contacts (or continues along) the absorbent inner material and chemically reacts with the anodes and cathodes of the battery 8 to produce a current and voltage which is output via the terminals to the power management module 22. Here the power is regulated into the proper current and voltage to power the wireless location beacon 14 and the audible alarm 16. Upon providing power directly to the alarm horn 16, the alarm sounds until power is discontinued. Upon providing the appropriate power to the wireless location beacon 14, it repeatedly sends its unique identification to the relay transceiver 30 via a wireless transmission protocol. The remote transceiver's relay microprocessor is scanning for a wireless signal in the same transmission protocol as that of the location beacon. Upon receipt of the location beacon's signal, the remote transceiver determines which unique identification correlates to which physical location in the building. The relay microprocessor generates an alert signal comprised of the location of the leak and sends it via the local router 36 and the internet as a http protocol web message to either the wireless carrier's website 38 or to an SMS gateway website 40. From here the signal is converted into the appropriate short message service (SMS) transmission protocol and sent wirelessly as an RF signal to the local cell tower 42 which routes it to the SMSC (Short Message Service Center) 44 which sends it to the closest cell tower 46 that routes it to the end user's cell phone 48 where it is received as a text alert.

In an alternate embodiment, the relay transceiver 30 has a cell chip that allows direction connection to a cell carrier and the designated contact cell or land based phone numbers. These may be owners, fire departments, maintenance crews, emergency responders or the like. For large hotel applications, the cell chip, or the internet alert signal generated may provide notification to an alarm panel. Here, the remote relay transceiver's microprocessor directs one or a series of text messages to be sent directly via the cell chip to the designated contact's smart phone.

In a second alternate embodiment, the relay microprocessor may generate a data package sent to the local computer 50 of an email using the user's phone numbers followed by a string of characters specific for each cell phone carrier (i.e. for AT & T it would be the phone number@text.att.net) which is sent via the local computer 50 via the local router 36 and internet and routed as a text message to the users cell phone or smart device. From there it is converted to an SMS protocol message and sent as a RF signal to the users cell phone as outlined above.

One of the benefits of the text messaging alert is that the message will always reach the appropriate cell phone. SMS messages are delivered even if the cell phone is turned off, unpowered or out of range. It is a store-and-message service. Once regular service is once again supplied to the cell phone, any waiting messages will come through. That is why the system has redundancy in that there are two identical but separate text messages sent. Additionally, the local computer may send the text message to a group of cell phones such as the husband, the wife, the kids, the maid etc. (broadcasting).

The method of use is quite simple and is comprised of the following steps:

connecting the wireless transceiver to a power source within wireless transmission range of all leak sensors and a local internet connected router, satellite or if a cell chip is utilized, within range of a cellular tower;

following directions on the exterior labeling to access application on an internet connected computer or smart device (cell phone, mobile computing device, tablet, or the like);

downloading the install application onto their smart device or computer;

opening the install application on their smart device or computer and following install prompts;

inputting identification numbers for each sensor, location of each sensor, smart device phone numbers and name of user's cell phone wireless carrier;

connecting the relay transceiver to the local internet connected router;

placing the leak sensors adjacent or beneath the area to be monitored for leakage;

optionally, placing salt onto the absorbent material extending from the opening of the battery; and optionally, placing a leak detection pan beneath the sensors; and optionally placing salt into the leak detection pan.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims. In the way of example, it is known that an alternative embodiment modular leak detector may send an audible message to the user's cell phone as a voice alert rather than, or in conjunction with, the text alert described herein. Here, the application would allow for and store voice recordings for the various leak sensor locations in a relational database that would be accessed upon the receipt of a signal from the transceiver and routed to the cell phone or smart device that had been identified earlier as the destination.

Figure 3:
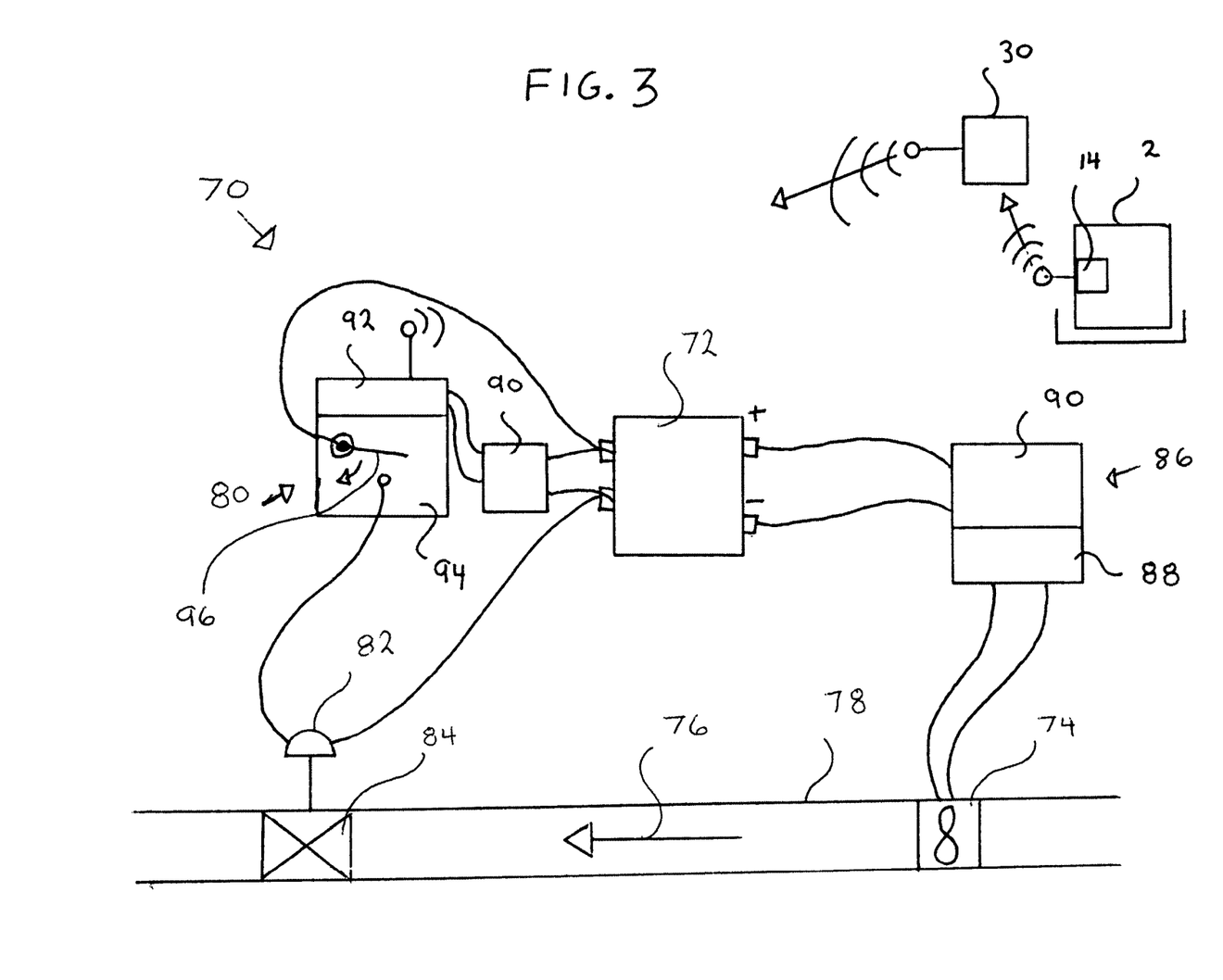
FIG. 3 is a schematic representation of the fail-safe, self powered shutoff valve apparatus.

Looking now at FIG. 3, the alternate fail-safe embodiment, it can be seen that this embodiment, designed to immediately stop the fluid leak, has three components: the leak sensor 2, the relay transmitter 30, and the self powered fluid shutoff apparatus 70. The first two of these components (the leak sensor 2, the relay transmitter 30) are identical to those described herein, in the simplest embodiment. The purpose of the self powered fluid shutoff valve apparatus 70 is to provide an electro-mechanical device or system, that is powered by a battery 72 with a maintenance "trickle" charge unit maintaining guaranteed battery power from a voltage/current produced from a fluid turbine 74 placed in the fluid flow 76 of the main fluid line (gas or liquid) 78. The battery 72 powers both the motor actuator controller with signal transceiver unit 80 and the shut off valve's actuator 82. In this way regardless of any power failures in the building, the self powered fluid shutoff valve apparatus 70 will always be able to receive an incoming leak signal from the relay transmitter 30 and power the controller unit 80 to send power from the battery 72 to operate the actuator 82 to close the shut off valve 84. In this embodiment the valve actuator is a DC rotational electric motor mechanically coupled to shut off valve 84, to drive the shut off valve to a fully closed position. It is known that other valve actuators such as hydraulic or pneumatic valve actuators may also be used wherein the battery power and electrical connections provided to the electric motor valve actuator, are routed to a solenoid in the pneumatic or hydraulic valve actuator. Such modifications are well known in the industry.

It is to be noted that the self powered fluid shutoff apparatus 70 is an add on to the simplest embodiment modular leak detector, although it may also be incorporated into other systems of leak detection and mitigation that utilized wireless or wired relay units to provide the initiating signal. While it may just utilize the relay transmitter 30 to communicate with its motor actuator controller with signal transceiver unit 80, it most likely will still utilize the relay transmitter to function the same way as the preferred embodiment in that it will still send signals out to the designated phones and emit a local alarm but it will also shut off the source of the fluid that is leaked for immediate damage mitigation. While the fail-safe embodiment 70 may theoretically be utilized as a stand alone system, operated by a leak signal sent by the relay transmitter 30, it is unlikely that the owner would not want to be notified that a fluid system had been shut off in the building in response to a leak.

Still looking at FIG. 3, the design, system components and operation of the self powered fluid shutoff valve apparatus 70 can better be explained. The system fluid (gas or liquid) is conveyed about the system through the main fluid line 78 in the direction indicated by arrow 76. In the main fluid line 78 is the shut off valve 84. This may be of any type of valve design that is optimized for positive shut off of the conveyed fluid and within the torque limitations that can be provided by the battery and the motor on the valve actuator 82. It may be a globe, gate, ball, plug, needle or other valve that is directly operated or operated with a gear train. Also located into the main fluid line 78 is the fluid turbine generator 74. (These are commonly called in-line hydro power generators or in-line hydro turbines, often used for conduit energy recovery applications.) Although illustrated mounted in-line with the main fluid line 78 in the main system fluid flow, it is known that there may be a bypass line taken off of the main fluid line 78 into which the turbine generator 74 is located. The turbine generator is a fan, turbine or similar design of rotating blade that is rotated by the system fluid moving past it. The blade is connected to a shaft or linkage that spins an electric generator (motor) and outputs an AC power (current and voltage) via first transfer wires to the battery charging unit 86. This charging unit 86 has a voltage conversion device 88 (such as an inverter) that converts the power to DC and a power management device 90 that provides a DC charging power profiled to the specific battery 72 used. This power management device 90 is an integrated circuit solid state device that directs the flow and direction of electrical power. It may incorporate circuitry to effect dynamic voltage scaling and/or dynamic frequency scaling as is well known in the industry. It provides optimal levels of charging power to the battery 72 through second transfer wires for maximum battery life.

The battery may be a single unit or comprised of multiple connected batteries as in the case of larger system shut off valves 84 requiring massive amounts of torque to be generated by the electric valve actuator 82 (generally a rotational electric motor) to close the valve 84. The battery 72 provides power to operate the valve actuator 82 and also provides power to the valve actuator controller with signal transceiver unit 80 through third transfer wires via the voltage regulator 90 and fourth transfer wires from the voltage regulator 90 to the valve actuator controller with signal transceiver unit 80. This valve actuator controller with signal transceiver unit 80 is made of a valve actuator controller 94 coupled to a wireless signal transceiver 92. Upon receipt of a leak signal from the relay transmitter 30 (preferably a wireless RF signal) at the signal transceiver 92, the signal transceiver generates and communicates an operate signal to the microprocessor in the valve actuator controller 94 that initiates the valve actuator 82.

The signal transceiver 92 and valve actuator controller 94 may operate on different voltages and incorporate their own voltage transformers. While the signal transceiver 92 in the preferred embodiment is a Bluetooth protocol wireless signal transceiver and operated generally on a 2.4 to 4.3 DC voltage, the microprocessor and relay in the motor actuator controller 94 may require a different voltage depending on the size and torque requirements of the valve 84 to be closed.

The power from the battery 72 to the valve actuator 82 comes from the battery 72 directly via fifth transfer wire and through the power relay 96 in the motor actuator controller via sixth transfer wire. The motor actuator controller uses its microprocessor to convert the incoming leak signal from the wireless signal transceiver 82 to an electric signal to operate its higher voltage relay to apply the power from the battery (preferably the positive voltage) to the valve actuator 84. Once the valve actuator receives both a positive and negative electrical source from the battery, the electrical circuit in the valve actuator's motor is completed and the motor turns and through linkage, closes the valve.

Simplifying the operation of a complete system: the signal transceiver 92 gets a leak signal from the relay transmitter 30 upon generation of a signal from the wireless location beacon 14 in the leak sensor 2 once the water powered battery gets wet. The signal transceiver 92 in response to the leak signal received, generates and communicates an operate signal to valve actuator controller that provides power from a battery to a valve actuator to close the mechanically connected valve. The battery provides all power for the equipment downstream of the relay transmitter 30 and its charge is kept topped up by an in-line fluid turbine generator. Therein, the entire system is not dependent on any outside power for operation.

It is known that various components of the self powered fluid shutoff apparatus 70 may be powered via an AC source but by eliminating every potential failure point and relying on a battery for all component operation the system is fail safe. Additionally, for many smaller fluid systems there is no electric power available at the location of the main shut off valve.

In use with other systems the self powered fluid shutoff valve need not be coupled to the leak sensor 2 as depicted herein. It may receive a signal wired or wireless to its valve actuator controller with signal transceiver unit 80 to operate the battery. The sensing device to initiate a valve shut off signal may be based on pressure, temperature, flow or chemical attributes such as viscosity, pH, optical refraction and the like.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The leak sensors, relay transceiver and router can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto. For example, while discussed using self-powered water batteries, it is envisioned that any other type of self-powered battery that utilizes a fluid for operation identical to the fluid to be monitored for leakage may be an alternate embodiment that adheres to the same basic principles of operation.

Having thus described the invention, what is claimed as new and desired to be secured by Letters Patent is as follows:

1. A self-powered, fail-safe, fluid shutoff apparatus for closing a fluid flow shutoff valve in a system fluid line, comprising:
    said shutoff valve installable in a system fluid line;
    a valve actuator that is a DC rotational electric motor mechanically coupled to said shut off valve to urge said shut off valve to a fully closed position;
    a valve actuator controller having a microprocessor that operates a power relay that provides power to said valve actuator motor to initiate operation of said valve actuator motor to close said fluid flow shutoff valve;
    a wireless signal transceiver in communication with said valve actuator controller, said signal transceiver upon receipt of a leak alarm signal, communicating an operate signal to said microprocessor in said valve actuator controller;
    a pan to collect leaked fluid, said pan containing an electrolytic booster NaCl salt to enhance the generation of electricity;
    a water-powered battery having an enclosure, said water-powered battery sitting in said pan, said water-powered battery made of at least one cell with an anode and a cathode, said water-powered battery contained in a shell with shell openings formed therethrough and an absorbent material, isolating and between said anode and said cathode, said absorbent material extending from said enclosure through said shell openings to an area surrounding said enclosure that resides in said pan, said water-powered battery providing a battery power to said wireless signal transceiver and said valve actuator controller through a voltage regulator, said battery also providing said battery power directly to said valve actuator motor through said valve actuator controller high voltage relay, so as to operate said motor to close said fluid flow shutoff valve;
    a fluid turbine generator installable in said system fluid line or a bypass line thereof;
    a battery charging unit connected between said fluid turbine generator and said battery;
    wherein said fluid turbine generator creates electric power that it provides to said battery through said battery charging unit to charge said battery, and said battery provides said battery power to operate all components of said self-powered fluid shutoff apparatus.

2. The self-powered, fail-safe, fluid shutoff apparatus of claim 1 wherein said battery charging unit further comprises:
    a voltage conversion device to change said electric power created by said fluid turbine generator from AC to DC; and
    a power management device connected to said voltage conversion device to provide optimal charging levels of DC power to said battery.

3. The self-powered, fail-safe, fluid shutoff apparatus of claim 1, further comprising:
    a leak sensor that upon generation of an electricity by an operably connected water powered battery, will wirelessly transmit a leak signal;
    a remote relay transceiver in communication with said leak sensor, said rely transceiver adapted for the wireless reception of said leak signal and subsequent broadcast of said leak alarm signal.

4. The self-powered, fail-safe, fluid shutoff apparatus of claim 3, further comprising:

a leak sensor that upon generation of an electricity by an operably connected water powered battery, will wirelessly transmit a leak signal;

a remote relay transceiver with a cell phone chip, said remote relay transceiver in communication with said leak sensor, said rely transceiver adapted for the wireless reception of said leak signal and subsequent broadcast of said leak alarm signal.

5. The self-powered, fail-safe, fluid shutoff apparatus of claim 4, further comprising:

an application that is downloadable onto a user's smart device, said application connects said relay transceiver to a local, connectable router to allow the input of a cell phone number of a user to be notified and other data for the configuration of said alarm leak signal broadcast.

6. The self-powered, fail-safe, fluid shutoff apparatus of claim 4, wherein said leak sensor further comprises:

a shell with openings formed therethrough, housing said water powered battery;

a wireless location beacon when powered, broadcasting a unique identifier and said leak signal to said remote relay transceiver;

a power management module connected between said water powered battery and said wireless beacon; and wherein said relay transceiver has a relay microprocessor containing a set of instructions that recognizes said unique identifier and generates said leak alarm signal with a location of said location beacon in a format transmissible as a cellphone text message.

7. The self powered fluid shutoff valve apparatus of claim 6 further comprising:

an absorbent material extending from beyond said enclosure of said leak sensor to an interior of said water powered battery through said openings formed through said shell; and an amount of sodium chloride disposed on said absorbent material.

8. The self powered fluid shutoff valve apparatus of claim 7 wherein said absorbent material in said water powered battery extends between an anode and a cathode in at least one cell in said battery.

* * * * *